(12) United States Patent
August et al.

(10) Patent No.: US 7,242,301 B2
(45) Date of Patent: Jul. 10, 2007

(54) RF-ENABLEMENT OF PRODUCTS AND RECEPTACLES THEREFOR

(75) Inventors: M Jason August, Toronto (CA); Paul Waterhouse, Selkirk (CA); John K Stevens, Stratham, NH (US)

(73) Assignee: Visible Assets, Inc., Mississauga (CA)

( * ) Notice: Subject to any disclaimer, the term of this patent is extended or adjusted under 35 U.S.C. 154(b) by 0 days.

(21) Appl. No.: 10/595,087

(22) PCT Filed: Jul. 20, 2005

(86) PCT No.: PCT/US2005/025633

§ 371 (c)(1),
(2), (4) Date: Feb. 6, 2006

(87) PCT Pub. No.: WO2006/014666

PCT Pub. Date: Feb. 9, 2006

(65) Prior Publication Data

US 2006/0232417 A1   Oct. 19, 2006

Related U.S. Application Data

(60) Provisional application No. 60/589,524, filed on Jul. 20, 2004.

(51) Int. Cl.
*G08B 13/14* (2006.01)

(52) U.S. Cl. ............... 340/572.1; 340/539.1; 340/539.32; 340/568.1; 700/214; 705/22

(58) Field of Classification Search ......... 340/572.1, 340/539.1, 539.32, 568.1; 700/214; 705/22
See application file for complete search history.

(56) References Cited

U.S. PATENT DOCUMENTS 4,792,796 A    12/1988  Bradshaw et al.
4,821,291 A    4/1989   Stevens et al.
4,879,756 A    11/1989  Stevens et al.
4,937,586 A    6/1990   Stevens et al.
5,177,432 A    1/1993   Waterhouse et al.
5,245,534 A    9/1993   Waterhouse et al.
5,260,694 A    11/1993  Remahl
5,374,815 A    12/1994  Waterhouse et al.
5,532,465 A    7/1996   Waterhouse et al.
5,929,760 A *  7/1999   Monahan ............... 340/572.1
6,084,513 A    7/2000   Stoffer
6,617,963 B1   9/2003   Watters et al.
6,703,935 B1   3/2004   Chung et al.
6,724,308 B2 * 4/2004   Nicholson ............. 340/572.1
7,028,861 B2   4/2006   Sayers et al.
7,049,963 B2   5/2006   Waterhouse et al.

(Continued)

FOREIGN PATENT DOCUMENTS

WO    01069525    9/2001
WO    02083507    10/2002

*Primary Examiner*—Jeffery Hofsass
*Assistant Examiner*—Samuel J Walk
(74) *Attorney, Agent, or Firm*—Oppedahl Patent Law Firm LLC (57) ABSTRACT

An RFID tag in a receptacle is active and includes a microprocessor, a data storage device operable to store a selected code (e.g. an ID code to identify said object or said product), the object including a display for displaying the aforesaid selected code upon a signal from the microprocessor and an energy storage device (e.g. a lithium ion battery), operable to energize the microprocessor, the display, and the transmitter. The tag has an antenna having a dimension thereof that is substantially as large as to a maximum dimension of receptacle.

17 Claims, 8 Drawing Sheets

U.S. PATENT DOCUMENTS

| | | |
|---|---|---|
| 2002/0177490 A1 | 11/2002 | Yong et al. |
| 2003/0174099 A1 | 9/2003 | Bauer et al. |
| 2004/0008123 A1 | 1/2004 | Carrender et al. |
| 2004/0053641 A1 | 3/2004 | Leung et al. |
| 2004/0069849 A1 | 4/2004 | Stevens et al. |
| 2004/0100380 A1 | 5/2004 | Lindsay et al. |
| 2004/0149822 A1 | 8/2004 | Stevens et al. |
| 2004/0205350 A1 | 10/2004 | Waterhouse et al. |
| 2005/0029345 A1 | 2/2005 | Waterhouse et al. |
| 2005/0043850 A1 | 2/2005 | Stevens et al. |
| 2005/0043886 A1 | 2/2005 | Stevens et al. |
| 2005/0083213 A1 | 4/2005 | Stevens et al. |
| 2005/0086983 A1 | 4/2005 | Stevens et al. |
| 2005/0149226 A1 | 7/2005 | Stevens et al. |
| 2005/0205817 A1 | 9/2005 | Marcichow et al. |
| 2005/0251330 A1 | 11/2005 | Waterhouse et al. |
| 2006/0124662 A1 | 6/2006 | Reynolds et al. |
| 2006/0128023 A1 | 6/2006 | Waterhouse et al. |
| 2006/0164232 A1 | 7/2006 | Waterhouse et al. |
| 2006/0220857 A1 | 10/2006 | August et al. |

* cited by examiner

RF-ENABLEMENT OF PRODUCTS AND RECEPTACLES THEREFOR

CROSS-REFERENCE TO RELATED APPLICATION

This application is a 371 of PCT/US05/25633 Jul. 20, 2005 which claims benefit of 60/589,524 Jul. 20, 2004.

BACKGROUND

This invention relates to identification and tracking of products, receptacles (including containers, boxes, and pallets), and other objects as they are transported and stored in moving through the supply chain from manufacturer to end-user. More particularly, the invention relates to the use of RFID tags and antennas therefor in receptacles, products, methods, and systems to achieve full visibility bf products throughout the levels of their supply chain.

High-value products such as medical devices must often be tracked traced and details recorded as it moves through a supply chain. In many cases the medical device itself is temperature sensitive, and time sensitive, and may have a specific expiry date. Many of these medical devices may be worth thousands to even tens of thousands of dollars. Therefore, security tracking and optimized inventory may be not only critical to the business but also could provide audit trial information that may be required by governmental authorities, such as the FDA (the United States Food and Drug Administration).

Many have proposed or discussed the use of radio frequency tags or what is now known as RF ID to track these high-value assets through a supply chain (e.g. US5774S76, US5S04S1 0). In most cases these RF tags are placed either inside the box containing-the asset, or placed outside the box using an adhesive tape or other attachment means. These tags are read by a mobile reader or in some cases by a fixed reader to identify the product. Moreover, smart radio tags can use features such as a Liquid Crystal Display (LCD) to indicate status of the asset; temperature sensors to provide data logs and alarms if certain temperature parameters are not met; light emitting diodes or LEDs as indicators to make picking and putting the asset optimal; and buttons and that may be used to detect whether the tag is attached too a package or enabling human input to the tag. These tags may typically be the size of the credit card or slightly larger. However several serious problems arise when tracking high-value assets that require full pedigree audits and reliable proof that the medical device (e.g. stent) or other product has not been tampered with, as well as to provide many other options.

SUMMARY OF THE INVENTION

Broadly and generally, the present invention provides integration of either entire RFID tags or only antennas thereof into objects, such as products (e.g. medical stents, CD's (compact discs), prescription medicine bottles) and receptacles (e.g. containers, packages, boxes, ULD's (unit load devices, as used in air freight), warehouse shelving, and the like) used to hold products.

Accordingly, the present invention provides an object operable for communicating wireless radio frequency (RF) signals, the aforesaid object comprising an antenna integrated (for example, an embedded ferrite loop) therewith.

Preferably, the aforesaid integrated antenna may be embedded into the aforesaid object (e.g. a CD/compact disk; a ULD (Unit Load Device), meat tray or other receptacle).

Moreover, the aforesaid integrated antenna should preferably have a dimension thereof that is substantially as large as a dimension of said object. The use of large antennas is particularly advantageous for low RF signal frequencies not exceeding 15 megahertz, and preferably not exceeding 1 megahertz. Moreover, the aforesaid integrated antenna may preferably comprise a loop integrated into the aforesaid object in each of two substantially orthogonal dimensions thereof.

According to a preferred embodiment, the aforesaid object comprises a product (e.g. stent) and an RFID tag attached thereto (e.g. integrated therewith), the aforesaid RFID tag comprising a transmitter and a tag antenna (preferably much smaller than the integrated antenna) operable to transmit wireless RF signals to the aforesaid integrated antenna.

Preferably, the aforesaid RFID tag is passive and further comprises a receiver, a microprocessor, a data storage device operable to store a selected code (e.g. an ID code to identify said object or said product), the aforesaid tag antenna being operable to receive incoming wireless RF signals from the integrated antenna and to communicate them to the receiver, the receiver being operable to communicate them to the microprocessor, the microprocessor being operable to read the aforesaid selected code (e.g. the aforesaid ID code) from the aforesaid data storage device in response to a selected set of said incoming wireless RF signals and to transmit such selected code wirelessly from the tag antenna to the integrated antenna, the integrated antenna being operable thereupon to transmit the aforesaid ID code wirelessly to a field antenna, which can communicate with the directly or by satellite to a central station or the internet.

According to another preferred embodiment, the aforesaid object comprises a receptacle and an RFID tag attached thereto (e.g. integrated therewith), the aforesaid RFID tag comprising a transmitter and a tag antenna operable to transmit wireless RF signals to the aforesaid integrated antenna.

According to another preferred embodiment, the aforesaid RFID tag is active and further comprises a microprocessor, a data storage device operable to store a selected code (e.g. ari ID code to identify said object or said product), the aforesaid object comprising a display for displaying the aforesaid selected code upon a signal from the aforesaid microprocessor and an energy storage device (e.g. a lithium ion battery), operable to energize the microprocessor, the display, and the transmitter.

Preferably, the aforesaid receptacle is operable to hold a product, the receptacle comprising a sensor operable to generate a signal characteristic of a condition (e.g. temperature, jog, etc.) experienced by the aforesaid product.

Thus, the aforesaid object may comprise a receptacle (e.g. a tray for holding meat), such receptacle being operable to receive and hold a product (e.g. a steak, a stent), such product having an RFID tag attached thereto and being operable for communicating the wireless radio signals (e.g. of a frequency not exceeding 1 MHZ) between said product and the aforesaid integrated antenna in the aforesaid receptacle.

The invention also provides a receptacle comprising:

a body portion operable to hold a product, an RFID tag attached to the aforesaid body portion, the aforesaid RFID tag comprising a receiver, a transmitter, and an antenna, the aforesaid antenna being integrated into a unitary relationship with the aforesaid body portion.

Preferably, the aforesaid RFID tag is operable to receive and transmit wirelessly at a frequency not exceeding 15 megahertz, with even lower frequencies not exceeding 1 megahertz, and even 300 kilohertz) being especially desirable for greater signal strength.

Preferably, the aforesaid antenna comprises a loop antenna designed for superior strength of signal reception by having dimensions thereof scaled to dimensions of said body portion, and has a dimension thereof that is substantially as large as to a maximum dimension of said receptacle. Moreover, the loop antenna preferably comprises a loop integrated into the aforesaid receptacle in each of two substantially orthogonal dimensions thereof.

Preferably, the aforesaid receptacle comprises a container operable to enclose the aforesaid product, such container further comprising a sensor disposed on a surface of the container and operable to generate a sealing signal indicating sealing of such container upon shrink-wrapping thereof.

Moreover, the aforesaid receptacle may comprise a container operable to enclose the aforesaid product, the aforesaid RFID tag further comprising a sensor disposed within such container and operable to generate a signal characteristic of a condition experienced by the product (e.g. temperature, light exposure, weight, humidity, and shock impulse (j°9))—Preferably, the aforesaid RFID tag further comprises an indicator element for indicating impending expiry of viability of said product, as by providing a signal selected from visible light and audible sound. Such indicator element may comprise colored LED's, a blinking lamp, or an LCD display.

Preferably, the aforesaid receptacle comprises a stackable container which is adapted for stacking upon other stackable containers to expose a surface of said stackable container for visual inspection, such stackable container further comprising an indicator element disposed on said surface and operable for indicating a condition selected from
a) temperature of said product,
b) sealing of said receptacle,
d) weight of said product,
e) humidity within said stackable container,
f) jog/shock imposed on said container, and
g) impending expiry of viability of said product.

According to a preferred embodiment, the aforesaid receptacle may comprise a pallet, ULD, warehouse shelving unit operable to hold a plurality of containers with integrated antennas or entire RFID tags, each antenna having a dimension thereof that is substantially as large as a maximum dimension of such pallet, ULD, or warehouse shelving unit.

The invention also provides a method of tracking the conditions of products, each such condition being selected from temperature, product enclosure (shrink-wrapping), light level, product weight, humidity, jog, product age/expiry, and product location (GPS coordinates), the aforesaid method comprising the steps of
a) placing each product onto a first receptacle, such first receptacle being provided with a sensor for an aforesaid condition and a passive RFID tag operable to emit first wireless signals that indicate a such condition of said product,
b) placing the aforesaid first receptacle into a second receptacle, such second receptacle being provided with a sensor for a such condition and an active RFID tag operable to receive such first signals and to emit second signals, at a wireless frequency not exceeding 15 megahertz, that indicate an aforesaid condition of a first or second receptacle.
c) detecting signals selected from the aforesaid first signals and the aforesaid second signals.
e) providing a visual or audible indication of a said condition.

Moreover, the aforesaid first receptacle may comprise a first antenna integrated therewith. Also, the aforesaid second receptacle may comprising a second antenna integrated therewith.

The invention further provides a method of tracking the conditions of products, each such condition being selected from temperature, product enclosure (shrink-wrapping), light level, product weight, humidity, jog, product age/expiry, and product location (GPS coordinates), the aforesaid method comprising the steps of:
a) integrating a passive RFID tag with a product, such passive RFID tag comprising a product antenna integrated into the product, such passive RFID tag being operable to emit wireless RF identification (ID) signals operable to identify the aforesaid product in response to a wireless RF interrogation signal;
b) placing the aforesaid product onto a first receptacle, such first receptacle being provided with a sensor for a said condition and an active RFID tag operable to emit the aforesaid RF interrogation signal, to receive the aforesaid ID signals, and to emit first RF signals operable to identify the aforesaid product and to indicate an aforesaid condition at the aforesaid first receptacle,
c) placing the aforesaid first receptacle into a second receptacle, the aforesaid second receptacle being provided with a sensor for an aforesaid condition and an active RFID tag operable to receive the aforesaid first signals and to emit second RF signals that indicate an aforesaid condition at one of the aforesaid first and second receptacles,
d) detecting auditable signals selected from the aforesaid first RF signals and the aforesaid second RF signals
e) transmitting auditable signals (e.g. by cable or by high frequency RF) detected at step This method may preferably further comprise the step of:
e) providing a visual (e.g. on an LCD display) or audible (e.g. an alarm bell) indication of a the aforesaid condition.

Preferably, the first receptacle comprises a first antenna integrated therewith. Also, The aforesaid second receptacle comprising a second antenna integrated therewith.

Preferably, the aforesaid first and second RF signals have a frequency not exceeding 1 megahertz.

The invention further broadly provides a system of tracking the conditions of products, each said condition being selected from temperature, product enclosure (shrink-wrapping), light level, product weight, humidity, jog, product age/expiry, and product location (GPS coordinates), the aforesaid system comprising:
a) a passive RFID tag integrated with an aforesaid product, such passive RFID tag comprising a product antenna integrated into said product, such passive RFID tag being operable to emit wireless RF identification (ID) signals operable to identify the aforesaid product in response to a wireless RF interrogation signal;
b) a first receptacle operable to hold the aforesaid product, the aforesaid first receptacle being provided with a sensor for a said condition and an active RFID tag operable to emit the aforesaid RF interrogation signal, to receive the aforesaid ID signals, and to emit first RF signals operable to identify the aforesaid product and to indicate an aforesaid condition at the aforesaid first receptacle,
c) a second receptacle operable to hold the aforesaid first receptacle, the aforesaid second receptacle being provided with a sensor for an aforesaid condition and an active RFID tag operable to receive the aforesaid first signals and to emit second RF signals that indicate an aforesaid condition at one of the aforesaid first and second receptacles, d) a field antenna operable to detect auditable signals selected from the aforesaid first RF signals and aforesaid second RF signals e) a transmitter operable to transmit auditable signals (e.g. by cable or by high frequency RF) detected at step (d) to a central station (e.g. via a satellite) for auditable recording thereat (e.g. on a write-once-only CD).

The aforesaid system may further comprise:

e) an indicator operable to providing a visual (e.g. on an LCD display) or audible (e.g. an alarm bell) indication of an aforesaid condition.

Preferably, the aforesaid first receptacle comprises a first antenna integrated therewith. Also, the aforesaid second receptacle comprises a second antenna integrated therewith.

Preferably, the aforesaid first receptacle comprises a stackable box, the aforesaid second receptacle being selected from a pallet, a ULD Unit Load Device), and a warehouse shelving unit.

DETAILED DESCRIPTION

According to an embodiment of the present invention, the RFID tag is integrated into, and forms part of the receptacle (e.g. container, package, tote, pallet) itself—to make the package the tag and the tag the package. In one preferred embodiment the package would be an injection-molded two-piece plastic box (with a top and a bottom), with electronics display and light emitting diodes (LED's) on the front of the plastic box. The inside of the box may have a light sensor/detector connected to the processor to indicate that it has not been opened as well as to provide history when the box was opened and closed during manufacturing. Optional buttons might be placed on the front of the package, so that when it becomes shrink wrapped with a plastic vacuum bag the buttons are depressed. Again, this provides a record of when the receptacle/package was sealed as well as when it was opened and thus an indication that the medical device (e.g. stent) package has not been tampered with until it goes into the patient. The display on the front of the package can be an alphanumeric display (e.g. LCD or liquid crystal display) and can be used to indicate the lot number, expiry dates, or any other critical information about the product held by the receptacle that might be useful to an end-user or to a person working in the warehouse. The LEDs could be used to indicate the product is expired and should not be used; alternatively, the LED indicators could also be flashed to indicate that this package is the next one to use when placed in a stack on a shelf. Other parameters such as temperature, jog history, humidity, can also be recorded and display on the LCD.

A great advantage of placing the electronics within the receptacle or package itself is the fact that the antenna or antennas can be larger and can be placed at different orientations on the receptacle, thereby increasing the strength of signal detected by the antenna, especially for lower frequencies of detected RF signal. According to the present invention, low frequencies not exceeding 15 megahertz, and advantageously not exceeding 1 megahertz, are preferred for use with such larger integrated antennas. In the case of a box receptacle, for example, loops of the antenna may be integrated, as by embedding into, the top, a side, and/or the back of the box, and thus a much larger area may be used for the antenna as compared to a conventional stick-on RFID tag or credit card size tag.

Advantageously, such a large antenna, which can be integrated into the receptacle in multiple orientations, can either a) be part of an RFID tag that is integrated into an object (a product or a receptacle for holding products) or (b) be a separate signal enhancement antenna (e.g. a ferrite loop) which can communicate at a close distance with a separate antenna of an RFiD tag that is attached or integrated into the object.

As will be understood, there are many have unexpected advantages of incorporating an RFID tag or an antenna with an object (either a product such as a CD, or a receptacle/package itself), making a design which is more functional and at lower cost. In most cases these high-value assets are distributed within a "closed loop" supply chain—a supply chain that is controlled by a single entity, thereby enabling recycling of receptacles or boxes which are integrated with a large separate antenna or with a complete RFID tag. The ability to recycle receptacles/boxes, that have embedded RFID tags which store data (in a memory or data storage device) about the history of the receptacle and the conditions it has experienced, is also advantageous since the recycled receptacles can be used as proof of use and for settlement purposes. It would be possible to include in the memory (data storage device) of the box the full pedigree of history of the product's use from the date of its manufacture to the name and address of of delivery to the final customer/enduser (e.g. hospital patient).

Figure 1:
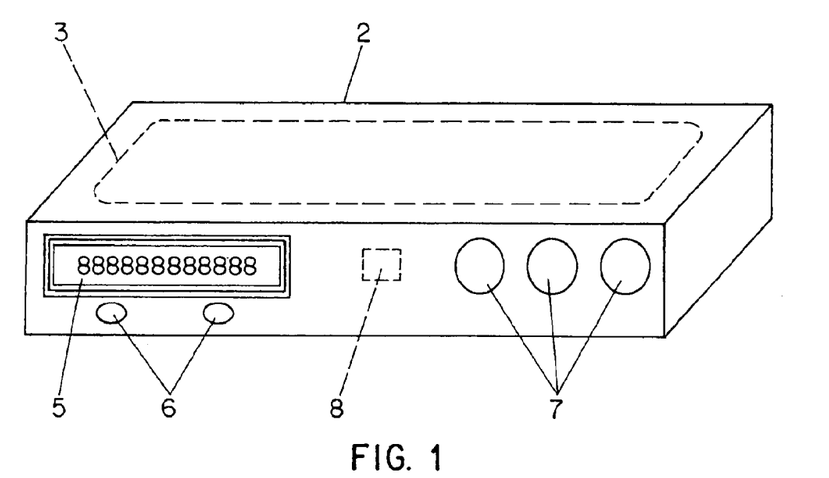
FIG. 1 is a schematic view of a novel receptacle (a Smart Package) with an integrated antenna and RFID tag, in accordance with the present invention.

FIG. 1 shows a typical Rf-enabled receptacle 2, in the form of a Smart package/box, with an antenna 3 embedded into at least one side of container 2, a (LCD) liquid crystal display 5, two light emitting diodes 6, three buttons 7, and optional temperature and humidity sensors/detectors 8, as well as a light sensor/detector 8 placed inside of the box 2. The buttons 7 could be used to indicate that the item has been moved or opened or other purposes requiring human input. The buttons 7 also can be designed so that when the box 2 is shrink-wrapped with plastic film, the buttons 7 are compressed, thereby providing a recordable indication that the package 2 is sealed, which can be used to prove that no one has tampered with this package 2.

Figure 2:
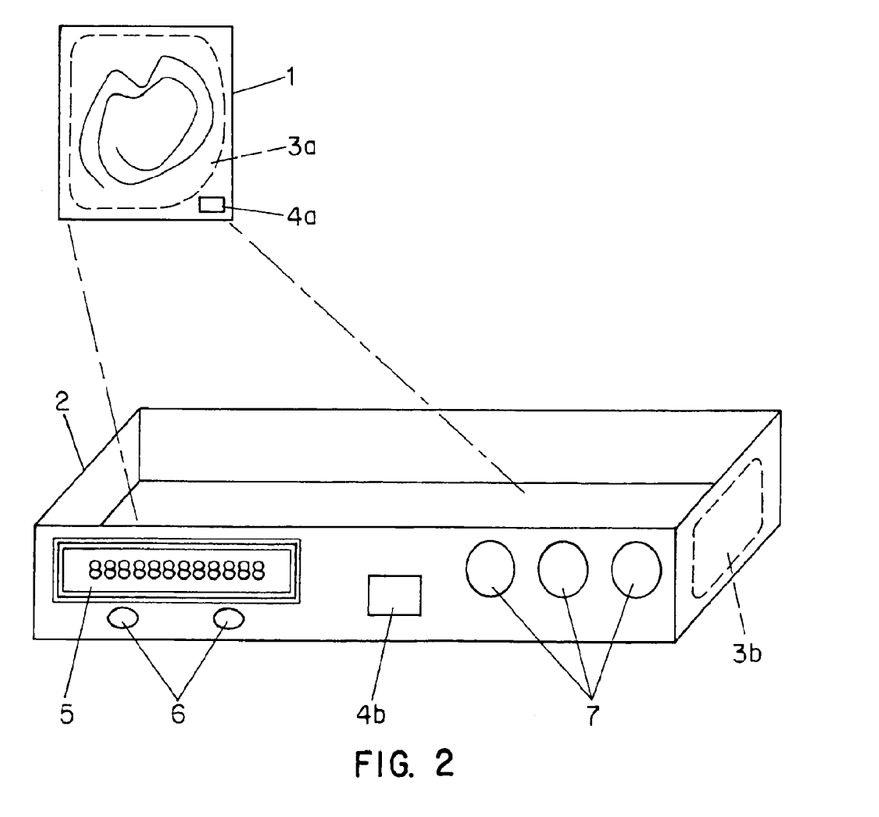
FIG. 2 is a schematic view of a novel receptacle with an integrated antenna and active RFiD tag and of a novel product (packaged stent) with an integrated antenna and a passive RFID tag.
Figure 3:
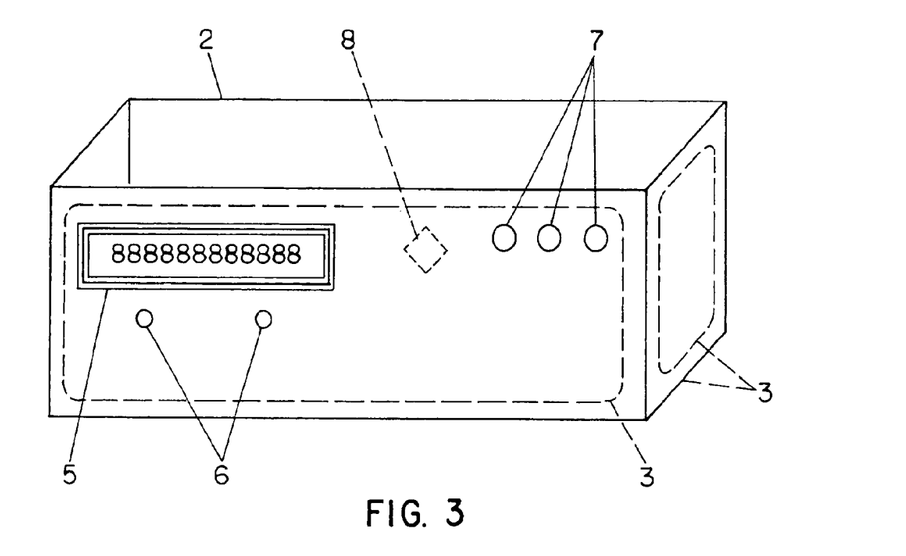
FIG. 3 is a schematic view of a novel receptacle with sensors therein.

FIG. 2 is a schematic diagram for a RF-enabled box 2 and an RF-enabled product 1 (e.g. a bagged stent), with its own integrated antenna 3a and integrated passive RFID tag 4a. This box 2 and its tag 4a is similar to other radio frequency tags; however the printed circuit board and component parts shown in FIG. 9 would be embedded into the plastic case portion for the box 2. The detector is might be placed inside of the box, and the loop antenna 3b shown in the block diagram may be placed on the top bottom or side of the box. It is also possible to place the loop antenna 3b on all three sides of the box to provide for enhanced and angle resistant communication. One of the major advantages of an RF-enabled product 1, package 2, or other object, over a more standard RFID tag is that the antennas 3a, 3b can be much larger, and antenna 3b can be in all three axes. A second advantage of a RF-enabled box/package 2 over a tag affixed to the exterior of a box is that sensors 8 may be selectively placed both inside the box 2 and outside the box 2. Moreover, an active RFID tag 4b can be used to interrogate the passive responder tags 4a that are FIG. 3 shows that another advantage of an RF-enabled ("smart") box 2 over a standard tag is that the layout and positioning of the LCD display 5 and LED's 6 can be optimally configured for storage on a shelf. The boxes 2 may be stout and stackable vertically or in other cases horizontally, and the form factor for thick boxes versus thin boxes etc. may be taken into account. Displays 5, buttons 7 and LED's 6 may be placed in the appropriate place for optimal storage and optimal use depending upon the product to be stored in totes 2 on shelving racks in a warehouse. It is possible to place a field loop antenna (see antenna 9 in FIGS. 7 and 8) around a set of boxes 2 and communicate wirelessly to all smart boxes contained in such a field loop 9. This enables full product audits, inventory tracking, checks of status (i.e. has the box been opened and is-it/has-it-always-been at the correct temperature etc.) with no human intervention. This makes it possible to generate a full product pedigree while products are stored in such RF-enabled boxes 2 either directly on a data storage device of the RFID tag integrated into the smart box 2 or the data received by antenna 9 may be stored on a local write-once-only CD or (via a warehouse web server 11 satellite and the internet) on a remote write-once-only CD.

Figure 4:
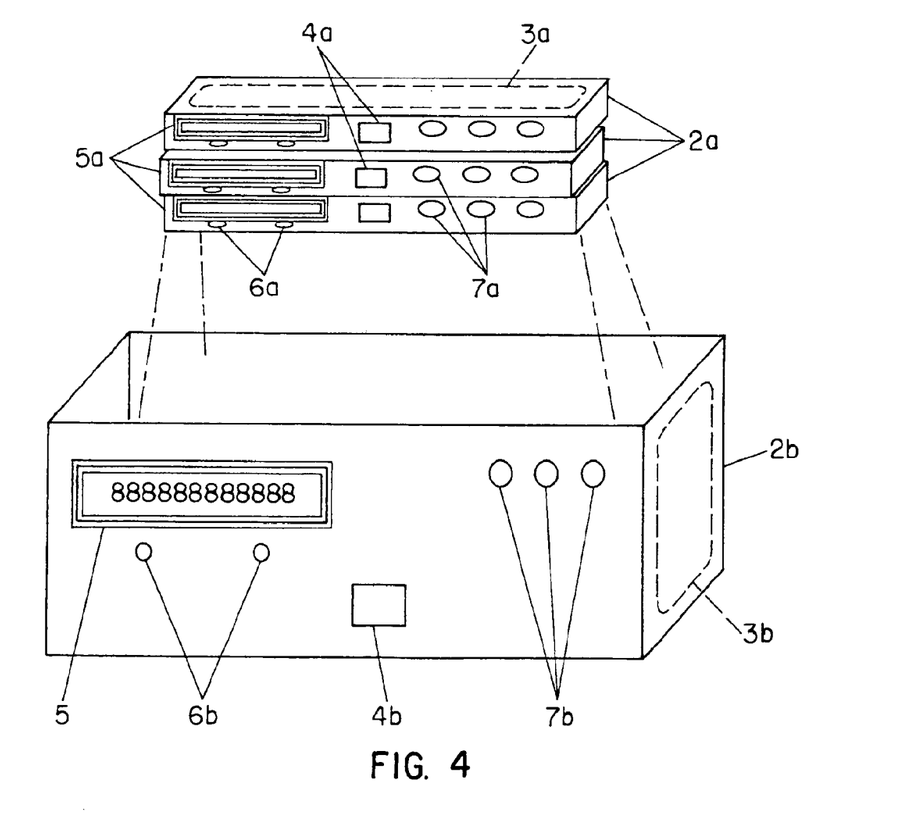
FIG. 4 is a schematic view of a novel receptacle in the form of a tote with an integrated antenna and active tag and of a number of smaller receptacles in the form of product containers with active tags integrated therein.
Figure 5:
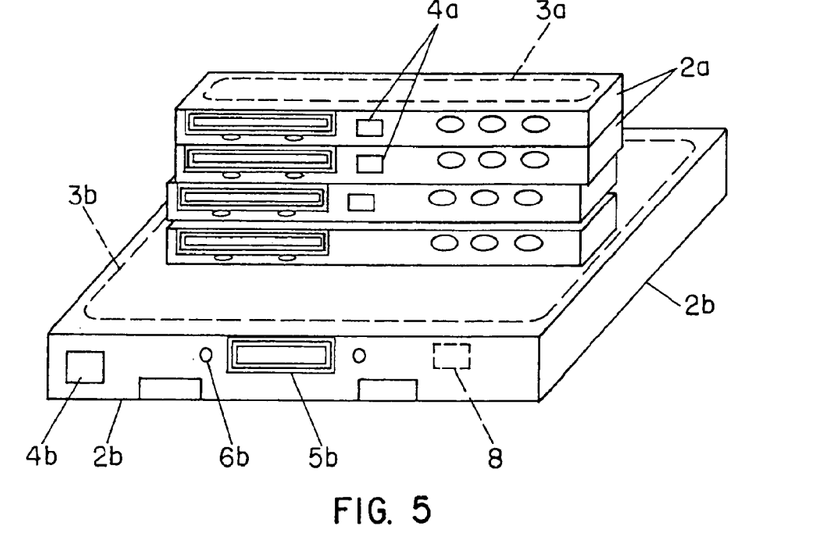
FIG. 5 is a schematic view of a novel receptacle in the form of a pallet with an integrated antenna and active tag and of a number of smaller receptacles in the form of product containers with active tags integrated therein.
Figure 6:
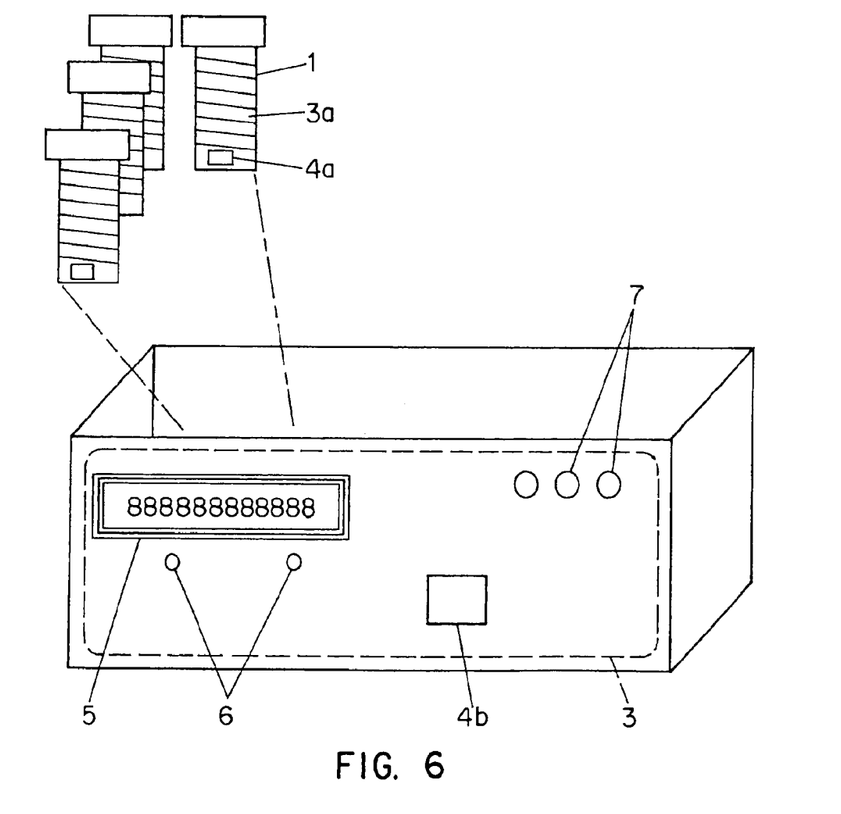
FIG. 6 is a schematic view of a novel receptacle in the form of a tote with an integrated antenna and active tag and of a number of smaller receptacles in the form of pill bottles with passive tags integrated therein.
Figure 7:
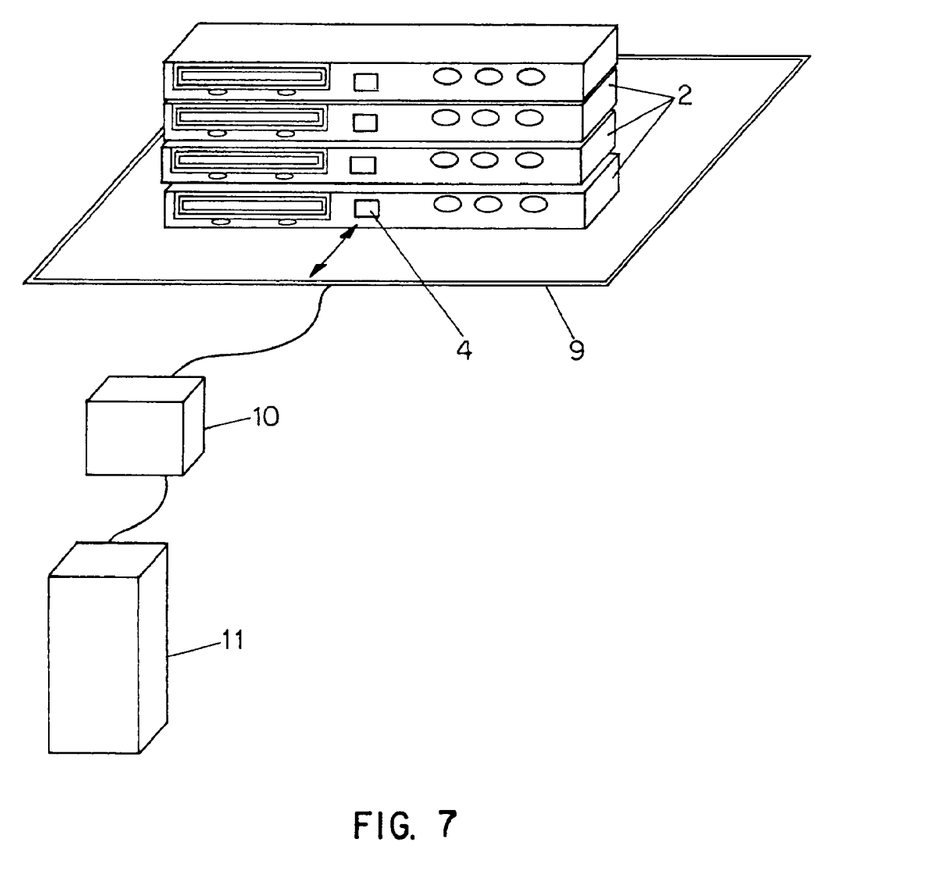
FIG. 7 is a schematic view of a warehouse with a number of RF-enabled receptacles, in the form of boxes having RFID tags integrated therewith, a field antenna for 2-way communication with the boxes, and a warehouse base station and server connected to the loop antenna.
Figure 8:
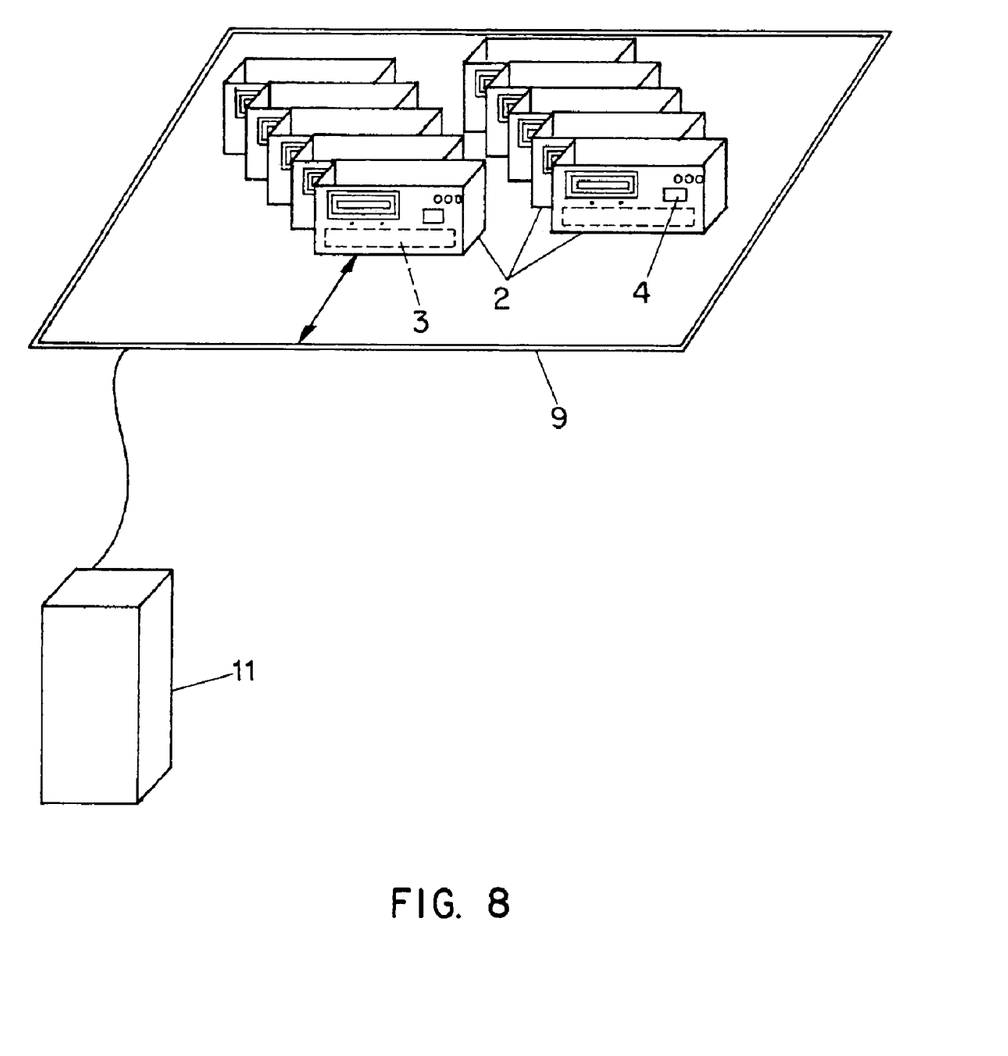
FIG. 8 is a schematic view of a warehouse with a number of RF-enabled receptacles, in the form of freight totes having RFID tags and antennas integrated therewith, a field antenna for 2-way communication with the boxes, and a warehouse server connected to the loop antenna.
Figure 9:
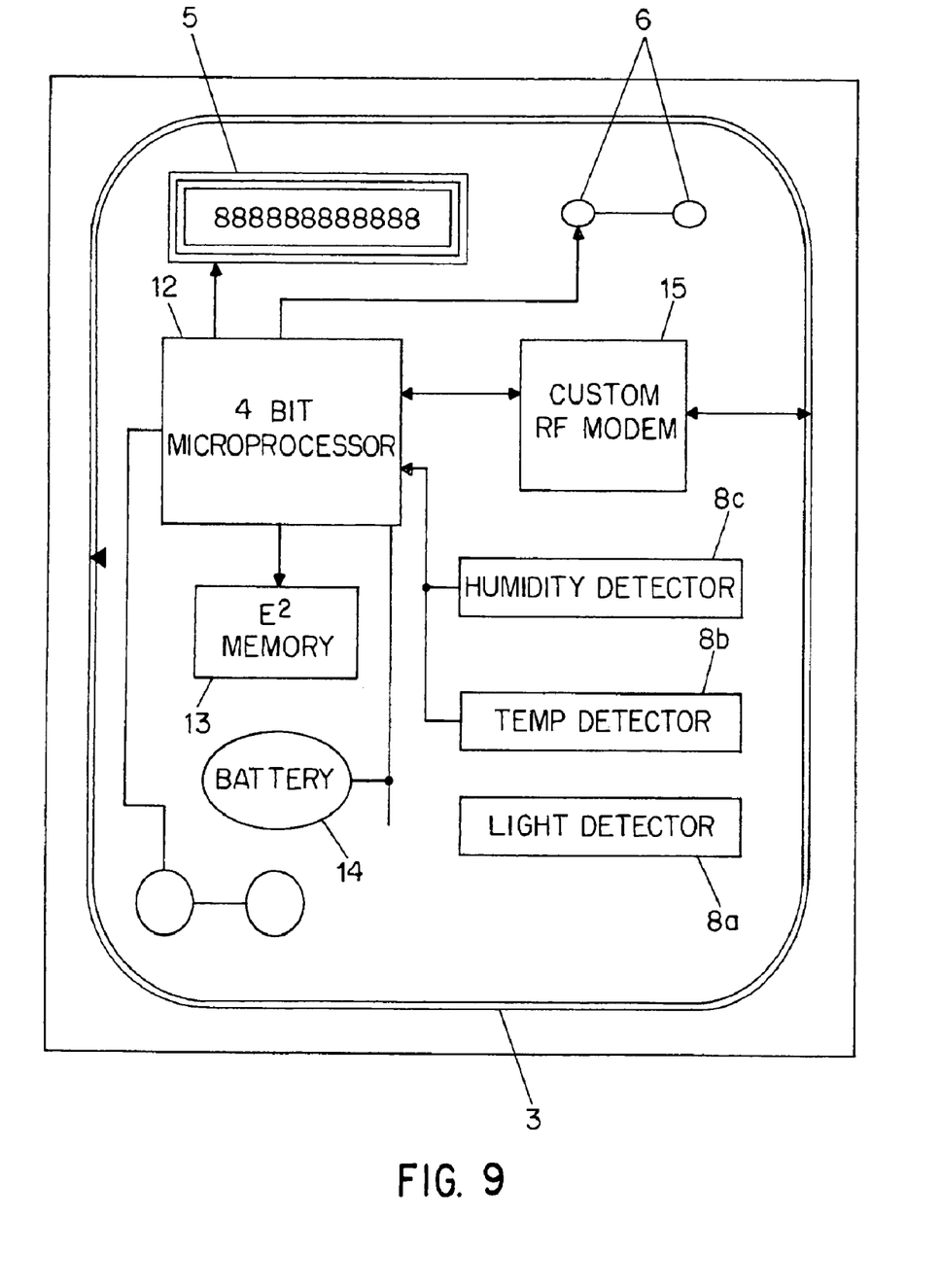
FIG. 9 is a schematic block diagram of RF-enableme πt components for use with a product or receptacle.
Figure 10:
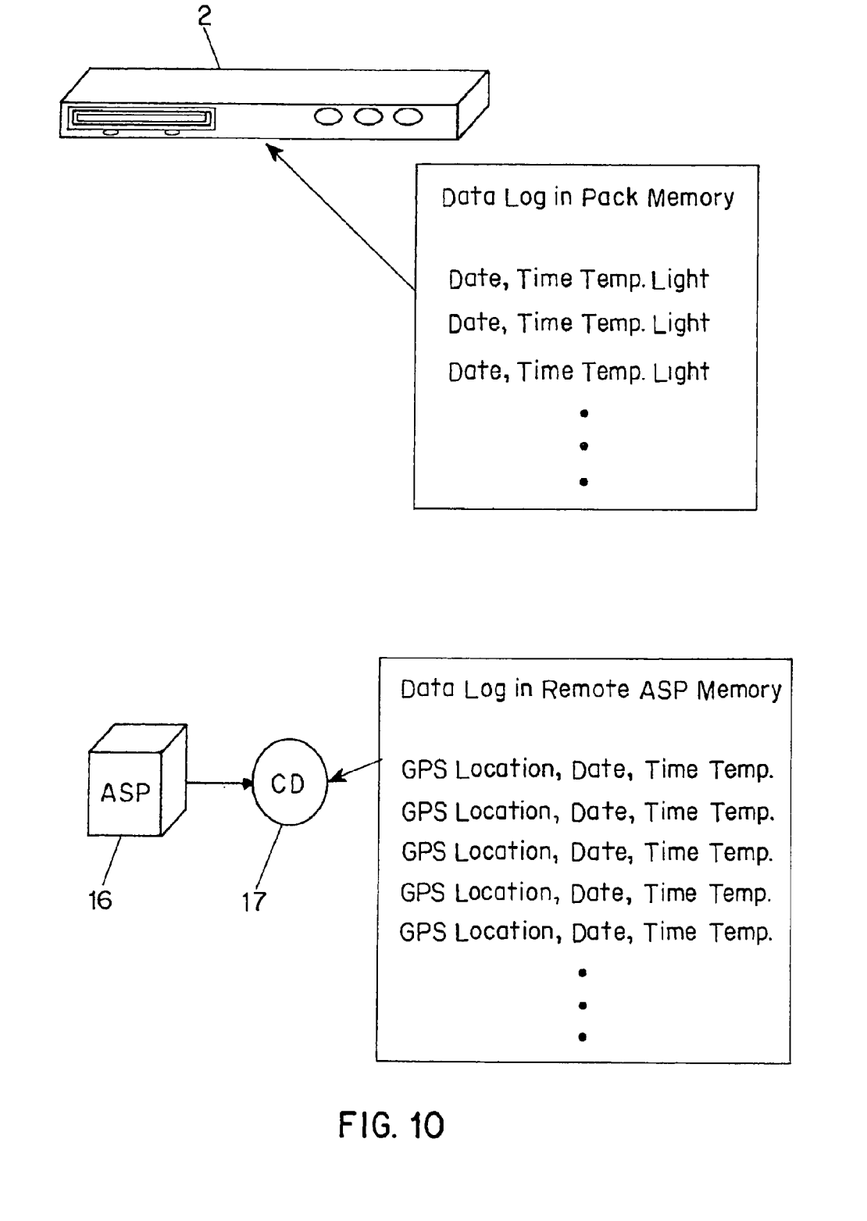
FIG. 10 is a schematic view of an RF-enabled receptacle, showing the data stored therein, and a remote ASP server and connected Read-Only (write-once-only) CD recorder to create an audit trail shown by the data recorded therein.

FIG. 4 and FIG. 5 show that a number of RF-enabled boxes 2a (with integrated antennas 3a, tags 4a, LCD displays 5a, LED's 6a, and buttons 7a) can be placed in/on a larger RF-enabled tote or pallet 2b which can be sealed and placed in the back of a truck equipped with a field antenna system 9 similar to that the described in FIGS. 7, 8. All boxes 2a could then be checked by interrogation from tags 4b of totes/pal lets 2b and confirmed while being transported with GPS locations provided along with current temperature, time as depicted by data logs in FIG. 10. These data logs would become part of the full product pedigree, and stored both in the smart box 2 as well as on a CD 17 connected to an ASP 16.

Figure 11A:
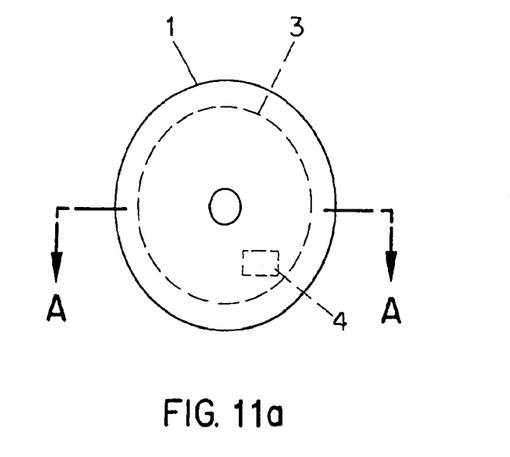
FIG. 11*a* is schematic plan view of a CD (compact disc) as a RF-enabled product.
Figure 11B:
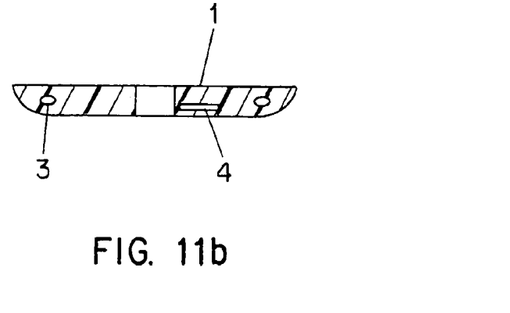
FIG. 11*b* is a cross-section along A—A of the CD shown in FIG. 11*a*.

FIG. 11a is schematic plan view of a CD (compact disc) as a RJF-enabled product! with an integrated antenna 3 and RFID tag 4 embedded therein, while FIG. 11b is a cross-section along A—A of the CD shown in FIG. 11a!

Figure 12A:
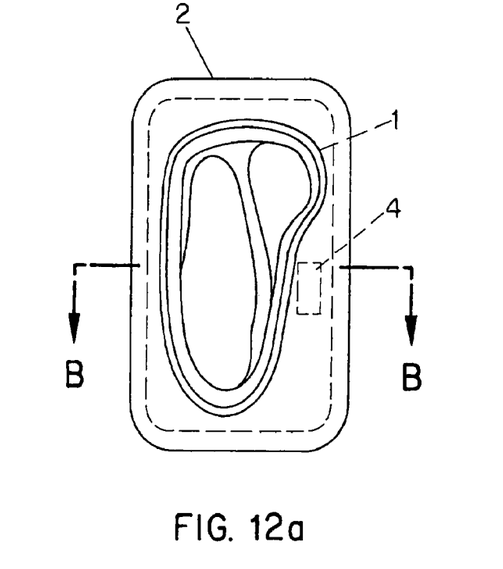
FIG. 12*a* is a top view of a meat tray.
Figure 12B:
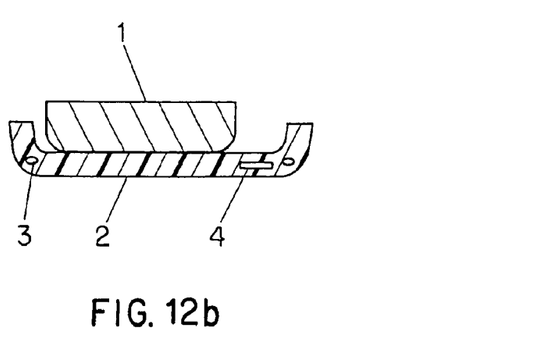
FIG. 12*b* is a cross-section along A—A of the meat tray shown in FIG. 12*a*. (check this)

FIG. 12a is schematic plan view of a meat tray 2 as a RF-enabled receptacle with a large embedded antenna 3 (substantially as large as the two largest dimensions of tray 2) and an embedded RFID tag 4, which can alternatively be attached directly to product 1 (a beef steak). FIG. 11b is a cross-section along A—A of the meat tray shown in FIG. 11a.

While the present invention has been described with reference to preferred embodiments thereof, numerous obvious changes and variations may readily be made by persons skilled in the fields of asset tracking and RFID tags. Accordingly, the invention should be understood to include all such variations to the full extent embraced by the claims.

What is claimed is:

1. An object operable for communicating wireless radio frequency (RF) signals,
   said object comprising an antenna integrated therewith,
   said object comprising a product and an RFID tag attached thereto,
   said RFID tag comprising a transmitter and a tag antenna operable to transmit wireless RF signals to said integrated antenna,
   said RFID tag being passive and further comprising
      a receiver,
      a microprocessor,
      a data storage device operable to store a selected code,
   said tag antenna being operable to receive incoming wireless RF signals from said integrated antenna and to communicate them to said receiver,
   said receiver being operable to communicate them to said microprocessor,
   said microprocessor being operable to read said selected code from said data storage device in response to a selected set of said incoming wireless RF signals and to transmit said selected code wirelessly from said tag antenna to said integrated antenna,
   said integrated antenna being operable thereupon to transmit said ID code wirelessly to a field antenna.

2. A receptacle comprising:
   a body portion operable to hold a product,
   an RFID tag attached to said body portion, said RFID tag comprising
      a receiver,
      a transmitter, and
      an antenna,
   said antenna being integrated into a unitary relationship with said body portion,
   said RFID tag being operable to receive and transmit wirelessly at a frequency
   not exceeding 300 kilohertz, said receptacle further comprising an indicator element operable for indicating a condition selected from a) impending expiry of viability of said product and b) sealing of said receptacle;

said receptacle comprising a sensor disposed on a surface of said receptacle and operable to generate a sealing signal indicating sealing of said receptacle upon shrink-wrapping thereof.

3. A receptacle comprising:

a body portion operable to hold a product, an RFID tag attached to said body portion, said RFID tag comprising
  a receiver,
  a transmitter, and
  an antenna, said antenna being integrated into a unitary relationship with said body portion, said RFID tag being operable to receive and transmit wirelessly at a frequency not exceeding 300 kilohertz, said receptacle comprising a container operable to enclose said product, said container further comprising a sensor disposed on a surface of said container and operable to generate a sealing signal indicating sealing of said container upon shrink-wrapping thereof;

said receptacle comprising a stackable container which is adapted for stacking upon other stackable containers to expose a surface of said stackable container for visual inspection, said stackable container further comprising an indicator element disposed on said surface and operable for indicating a condition selected from
  a) temperature of said product,
  b) sealing of said receptacle,
  c) light exposure within said stackable container,
  d) weight of said product,
  e) humidity within said stackable container,
  f) jog/shock imposed on said container, and
  g) impending expiry of viability of said product.

4. A receptacle as set forth in claim 3, said indicator element being operable to provide a signal selected from visible light and audible sound.

5. A receptacle as set forth in claim 4, said indicator element being an LCD display.

6. A receptacle as set forth in claim 4, said indicator element being a blinking lamp.

7. A method of tracking the conditions of products, each said condition being selected from temperature, product enclosure, light level, product weight, humidity, jog, product age/expiry, and product location, said method comprising the steps of:

a) integrating a passive RFID tag with a product, said passive RFID tag comprising a product antenna integrated into said product, said RFID tag being operable to emit wireless RF identification (ID) signals operable to identify said product in response to a wireless RF interrogation signal;

b) placing said product onto a first receptacle, said first receptacle being provided with a sensor for a said condition and an active RFID tag operable to emit said RF interrogation signal, to receive said ID signals, and to emit first RF signals operable to identify said product and to indicate a said condition at said first receptacle, c) placing said first receptacle into a second receptacle, said second receptacle being provided with a sensor for a said condition and an active RFID tag operable to receive said first signals and to emit second RF signals that indicate a said condition at one of said first and second receptacles, d) detecting auditable signals selected from said first RF signals and said second RF signals e) transmitting auditable signals detected at step (d) to a central station for auditable recording thereat.

8. A method as set forth in claim 7, and further comprising the step of:

f) providing a visual (e.g. on an LCD display) or audible (e.g. an alarm bell) indication of a said condition.

9. A method as set forth in claim 7, said first receptacle comprising a first antenna integrated therewith.

10. A method as set forth in claim 9, said second receptacle comprising a second antenna integrated therewith.

11. A method as set forth in claim 7, said RF signals having a frequency not exceeding 1 megahertz.

12. A system of tracking the conditions of products, each said condition being selected from temperature, product enclosure, light level, product weight, humidity, jog, product age/expiry, and product location, said system comprising:

a) a passive RFID tag integrated with a said product, said passive RFID tag comprising a product antenna integrated into said product, said RFID tag being operable to emit wireless RF identification (ID) signals operable to identify said product in response to a wireless RF interrogation signal;

b) a first receptacle operable to hold said product, said first receptacle being provided with a sensor for a said condition and an active RFID tag operable to emit said RF interrogation signal, to receive said ID signals, and to emit first RF signals operable to identify said product and to indicate a said condition at said first receptacle, c) a second receptacle operable to hold said first receptacle, said second receptacle being provided with a sensor for a said condition and an active RFID tag operable to receive said first signals and to emit second RF signals that indicate a said condition at one of said first and second receptacles, d) a field antenna operable to detect auditable signals selected from said first RF signals and said second RF signals e) a transmitter operable to transmit auditable signals detected at step (d) to a central station for auditable recording thereat.

13. A system as set forth in claim 12, said system further comprising:

f) an indicator operable to providing a visual or audible indication of a said condition.

14. A method as set forth in claim 12, said first receptacle comprising a first antenna integrated therewith.

15. A system as set forth in claim 14, said second receptacle comprising a second antenna integrated therewith.

16. A system as set forth in claim 15, said RF signals having a frequency not exceeding 15 megahertz.

17. A system as set forth in claim 15, said first receptacle comprising a stackable box, said second receptacle being selected from a pallet, a Unit Load Device, and a warehouse shelving unit.

* * * * *